United States Patent
Arends et al.

(10) Patent No.: US 8,595,231 B2
(45) Date of Patent: Nov. 26, 2013

(54) RULESET GENERATION FOR MULTIPLE ENTITIES WITH MULTIPLE DATA VALUES PER ATTRIBUTE

(75) Inventors: Mitch J. Arends, Rochester, MN (US); Michael T. Breitbach, Rochester, MN (US); Richard D. Dettinger, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 11/740,355

(22) Filed: Apr. 26, 2007

(65) Prior Publication Data

US 2008/0270447 A1 Oct. 30, 2008

(51) Int. Cl.
*G06F 7/00* (2006.01)
(52) U.S. Cl.
USPC ............ 707/737; 707/723; 707/741; 707/759
(58) Field of Classification Search
None
See application file for complete search history.

(56) References Cited

U.S. PATENT DOCUMENTS

| | | | |
|---|---|---|---|
| 6,732,094 B1 * | 5/2004 | Cousins et al. | 707/5 |
| 6,996,558 B2 | 2/2006 | Dettinger et al. | |
| 7,054,877 B2 | 5/2006 | Dettinger et al. | |
| 7,171,427 B2 * | 1/2007 | Witkowski et al. | 707/104.1 |
| 7,433,886 B2 * | 10/2008 | Rathakrishnan et al. | 707/103 R |
| 2003/0167274 A1 * | 9/2003 | Dettinger et al. | 707/100 |
| 2003/0169284 A1 * | 9/2003 | Dettinger et al. | 345/708 |
| 2004/0122844 A1 * | 6/2004 | Malloy et al. | 707/102 |
| 2004/0260658 A1 * | 12/2004 | Dettinger et al. | 705/400 |
| 2006/0004735 A1 * | 1/2006 | Dettinger et al. | 707/4 |
| 2006/0122993 A1 | 6/2006 | Dettinger et al. | |
| 2006/0136382 A1 * | 6/2006 | Dettinger et al. | 707/3 |
| 2007/0067371 A1 * | 3/2007 | Allan et al. | 707/206 |
| 2007/0270142 A1 * | 11/2007 | Willey et al. | 455/434 |

OTHER PUBLICATIONS

U.S. Appl. No. 11/272,583, entitled "Abstract Rule Sets," filed Nov. 10, 2005.

* cited by examiner

*Primary Examiner* — Mohammad S Rostami
(74) *Attorney, Agent, or Firm* — Patterson & Sheridan LLP (57) ABSTRACT

Embodiments of the invention provide techniques for processing abstract rules with query results having rows with multiple data values per column. In general, value fields are created to store the multiple data values of each attribute contained in each row of the query results. The abstract rule is transformed, resulting in a single executable rule corresponding to each row of the query results. Each executable rule references the value fields created to store the multiple data values. Each executable rule is then processed, utilizing the value fields of the corresponding row as rule inputs.

21 Claims, 5 Drawing Sheets

| ENTITY-BASED OUTPUT | | |
|---|---|---|
| PATIENT_ID 420 | TEST_A 422 | TEST_B 424 |
| 5001 | 24.0 | 101.0 |
| 5002 | 33.2<br>36.1<br>29.0 | 110.9 |
| 5005 | 22.5<br>24.3 | 105.1<br>106.3 |
| 5010 | 39.7 | 112.4<br>112.7<br>112.1 |
| 5017 | 19.8 | - |

RULESET GENERATION FOR MULTIPLE ENTITIES WITH MULTIPLE DATA VALUES PER ATTRIBUTE

CROSS-REFERENCE TO RELATED APPLICATIONS

This application is related to the following: commonly assigned, U.S. Pat. No. 6,996,558, issued Feb. 7, 2006, entitled "Application Portability and Extensibility through Database Schema and Query Abstraction;" commonly assigned, U.S. Pat. No. 7,057,877, issued May 30, 2006, entitled "Dealing with Composite Data through Data Model Entities;" commonly assigned, co-pending U.S. patent application Ser. No. 11/272,583, entitled "Abstract Rule Sets," filed Nov. 10, 2005, and commonly assigned, co-pending application entitled "Abstract Query Plan," Ser. No. 11/005,418, filed Dec. 6, 2004, published as U.S. Publication No. 20060122993, each of which is incorporated by reference herein in its entirety.

BACKGROUND OF THE INVENTION

1. Field of the Invention

The invention generally relates to computer database systems. More particularly, the invention relates to techniques for processing abstract rules with query results having rows with multiple data values per column.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. A SQL query is composed from one or more clauses set off by a keyword. Well-known SQL keywords include the SELECT, WHERE, FROM, HAVING, ORDER BY, and GROUP BY keywords.

Typically, composing a proper SQL query requires that a user understand both the structure and content of the relational database as well as the complex syntax of the SQL query language (or other query language). The complexity of constructing an SQL statement, however, generally makes it difficult for average users to compose queries of a relational database. Because of this complexity, users often turn to database query applications to assist them in composing queries of a database. One technique for managing the complexity of a relational database, and the SQL query language, is to use database abstraction techniques. Commonly assigned U.S. Pat. No. 6,996,558, entitled "Application Portability and Extensibility through Database Schema and Query Abstraction," discloses techniques for constructing a database abstraction model over an underlying physical database.

U.S. Pat. No. 6,996,558 discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

In some situations, the results of database queries can take the form of Cartesian products, meaning that the results include the various combinations of the query attribute values, and may have the same attribute values duplicated in multiple rows. Such query results may make analysis of the data difficult. For example, a hospital database may store results of medical tests administered to patients. A query of the hospital database may result in a Cartesian product, and thus may return multiple rows of query results for each patient. A medical researcher seeking to evaluate such query results may find it difficult to interpret patient data that is spread out over many rows.

One approach to making such query results easier to use is to generate them with an entity-based format. That is, the query results are grouped for a given attribute field, or "model entity," and are combined so grouped results are presented in a single row, with each column including all values for that attribute and for that model entity. For example, a hospital may store the results of medical tests performed on patients in a table of an abstract database, with each column of the table representing a different type of test. A query of the abstract database may be composed to use the patients as entities, and to produce query results with an entity-based format. If so, each row of the query results would represent a single patient, and each column within that row would include the results of all instances of a particular type of test that have been administered to that patient. Thus, since each patient may have taken the same type of test on a different number of instances, a given column may include a different number of values in each row. The use of an entity-based output format can produce query results that are easier to read, since they include a single row for each model entity. Commonly assigned, co-pending U.S. patent application Ser. No. 10/403,356, filed Mar. 31, 2003, titled "Dealing with Composite Data through Data Model Entities," discloses techniques for using model entities in database queries.

In some situations, data that is collected and stored in a database can be used as input to analysis routines for various purposes, including know-how management, decision making and statistical analysis. For instance, in a broad variety of applications, analysis routines are executed on query results obtained by executing corresponding queries against an underlying database.

Analysis routines can be defined by rule sets including one or more rules, each having predicates and actions. Commonly, the rules will have the structure "IF [predicate] THEN [action]." A rule predicate is a conditional statement evaluated in a rule engine. If the predicate is satisfied (i.e., the condition is met), then the associated rule action is executed. In other words, a set of rules can be used to implement an analysis routine, and a rule engine can evaluate predicates and fire or execute actions defined in the rules. Where actions of rules are defined to provide recommendations for users, such as treatment recommendations for doctors in medical institutions, the rules can be defined such that corresponding predicates reflect expert-based knowledge of possible diagnoses and evaluations of patient conditions. In other words, rules can be implemented to assist doctors by making diagnosis recommendations, drug recommendations, providing reminders of required verifications and checks, etc.

However, the creation of rules is generally a complex and difficult process which requires detailed knowledge of a corresponding database(s). More specifically, for each predicate and each action of the given rule that the user wants to create, the user requires an understanding of the database schema in order to look up a corresponding column name in the underlying database table(s). One technique for managing the creation of rules is to use abstract rule sets. Commonly assigned U.S. application Ser. No. 11/272,583 (hereafter "the '583 application"), entitled "Abstract Rule Sets," discloses techniques for using abstract rule sets.

Abstract rules are composed by referencing logical fields of a database abstraction model, and thus do not require a user to understand the schema of the physical database. To be used, abstract rules must be translated into an executable form that can be processed by a rule engine. In addition, as with the abstract queries, the abstract rules must be resolved to the physical database. Typically, abstract rules are composed by a "rule makers," based on their expertise and on previously-collected data. The abstract rules may then be provided to "rule users," who may execute the abstract rules by using query results as inputs.

However, in the situation where query results are produced with an entity-based format, they may not be suited for use as inputs to abstract rules. As described above, query results with an entity-based format may include rows that have multiple values stored in a single column (i.e., attribute). Additionally, the number of such values can vary from one row to the next. Since abstract rules are composed to reference a fixed set of logical fields, they typically cannot use query results having an entity-based format as input.

Therefore, there is a need for techniques for processing abstract rules with query results having an entity-based format.

SUMMARY OF THE INVENTION

The invention generally relates to computer database systems. More particularly, the invention relates to techniques for processing abstract rules with query results having rows with multiple data values per column.

One embodiment of the invention provides a computer-implemented method of processing an abstract rule, comprising: receiving an abstract rule having a conditional statement and a consequential statement, wherein the consequential statement defines a particular recommendation that is returned when the conditional statement is satisfied, wherein the conditional statement and the consequential statement are defined using a set of logical fields, and wherein the logical fields are defined in an abstraction model that models underlying physical data in a manner making a schema of the physical data transparent to a user of the abstraction model; receiving a set of query results including a row having a plurality of values for a column; generating a plurality of value fields, each storing one of the plurality of values in the row; transforming the abstract rule to generate an executable rule, wherein each logical field included in the abstract rule is replaced with at least one of the generated value fields logically related to the logical field being replaced; and processing the executable rule, using the generated value fields as rule inputs.

Another embodiment of the invention provides a computer readable storage medium containing a program which, when executed, performs an operation, comprising: receiving an abstract rule having a conditional statement and a consequential statement, wherein the consequential statement defines a particular recommendation that is returned when the conditional statement is satisfied, wherein the conditional statement and the consequential statement are defined using a set of logical fields, and wherein the logical fields are defined in an abstraction model that models underlying physical data in a manner making a schema of the physical data transparent to a user of the abstraction model; receiving a set of query results including a row having a plurality of values for a column; generating a plurality of value fields, each storing one of the plurality of values in the row; transforming the abstract rule to generate an executable rule, wherein each logical field included in the abstract rule is replaced with at least one of the generated value fields logically related to the logical field being replaced; and processing the executable rule, using the generated value fields as rule inputs.

Yet another embodiment of the invention provides a system, comprising: an abstract rule translator; and a processor configured to execute the abstract rule translator to receive an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model; receive a set of query results including a row having a plurality of values for a column; generate a plurality of value fields, each storing one of the plurality of values in the row; transform the abstract rule to generate an executable rule, wherein each logical field included in the abstract rule is replaced with at least one of the generated value fields logically related to the logical field being replaced; and process the executable rule, using the generated value fields as rule inputs.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for processing abstract rules with query results having rows with multiple data values per column. In general, value fields are created to store the multiple data values of each attribute contained in each row of the query results. The abstract rule is transformed, resulting in a single executable rule corresponding to each row of the query results. Each executable rule references the value fields created to store the multiple data values. Each executable rule is then processed, utilizing the value fields of the corresponding row as rule inputs.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
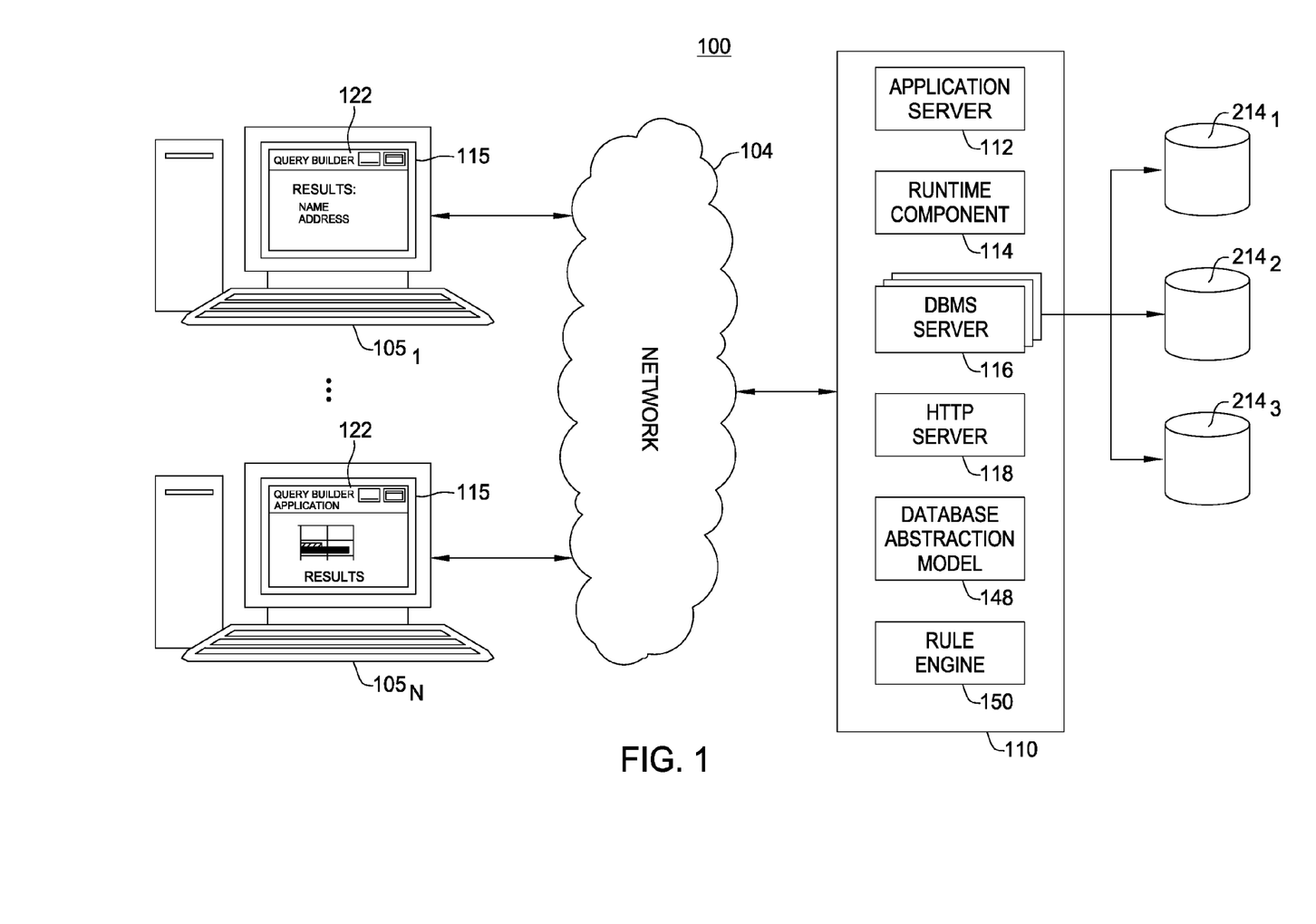
FIG. 1 is a block diagram illustrating a network environment, according to one embodiment of the invention.

FIG. 1 illustrates a network environment 100 using a client-server configuration. Client computer systems 105$_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include a runtime component 114, a database management system (DBMS) 116, a database abstraction model 148, and a rule engine 150. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

In one embodiment, the rule engine 150 represents one or more rule engines (i.e., inference engines) configured to carry out analysis routines for various purposes, including know-how management, decision making and statistical analysis. More specifically, the rule engine 150 can carry out analysis routines by processing rule sets including one or more rules, with each rule having predicates and actions. The rule engine 150 may be a software application installed on server 110. Alternatively, the rule engine 150 may be provided as "software as a service" (SAAS), wherein functions on a remote hosted system are accessed over a network as required.

In one embodiment, the rule engine 150 may be configured to process abstract rules. Abstract rules are composed by referencing logical fields of a database abstraction model, and thus do not require a user to understand the schema of the physical database. Commonly assigned U.S. application Ser. No. 11/272,583 (hereafter "the '583 application"), entitled "Abstract Rule Sets," discloses techniques for using abstract rules.

Figure 2:
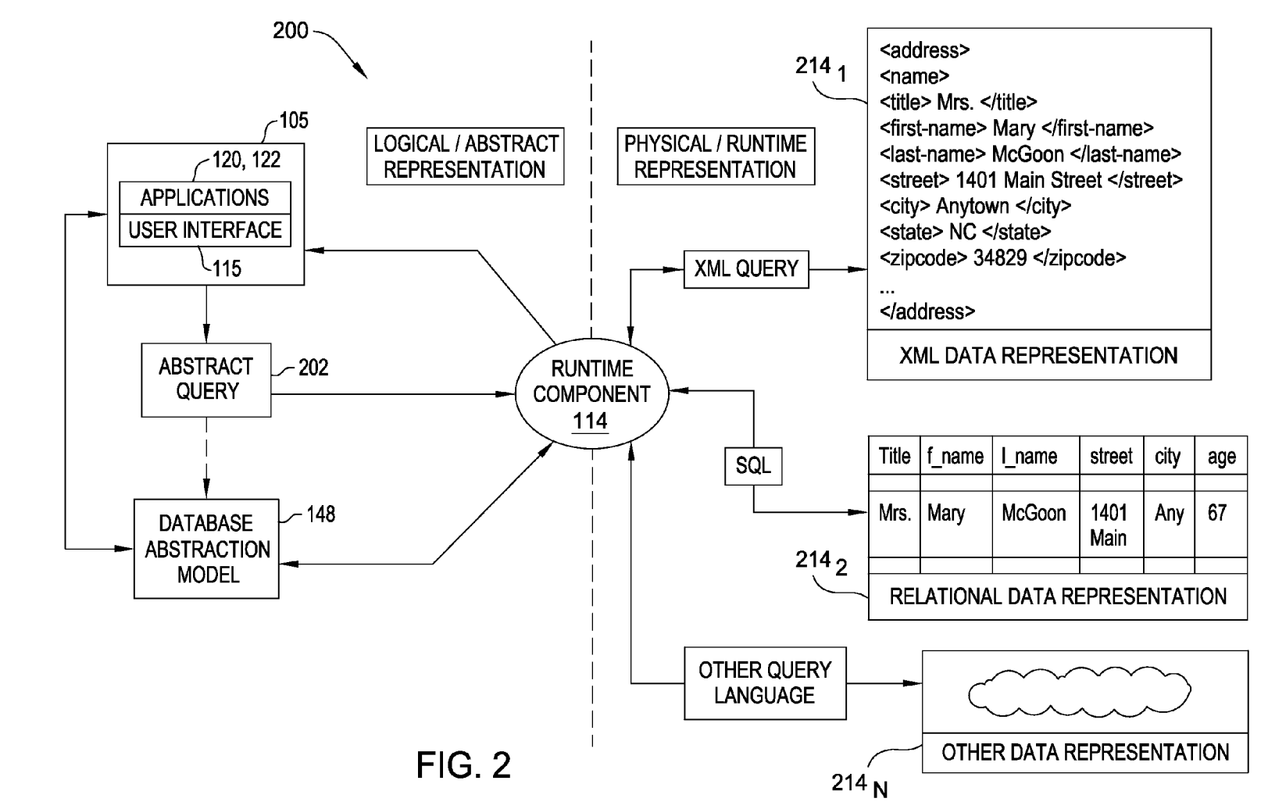
FIG. 2 is a logical view illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users compose an abstract query 202 using the user interface 115. An abstract query 202 is generally referred to as "abstract" because it is composed using logical fields rather than direct references to data structures in the underlying physical databases 214. The logical fields include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed). Particular types of access methods and embodiments for executing abstract queries are further described in commonly assigned U.S. Pat. No. 6,996,558, entitled "Application Portability and Extensibility through Database Schema and Query Abstraction," and commonly assigned, co-pending application titled "Abstract Query Plan," Ser. No. 11/005,418, filed Dec. 6, 2004, both of which are incorporated herein in their entirety.

In one embodiment, the results of the abstract query 202 may be used as inputs for executing an abstract rule. That is, a rule engine (e.g., rule engine 150 illustrated in FIG. 1) may be configured to process abstract rules by using the results of an abstract query 202 as rule inputs. In addition, the results of an abstract query 202 may be formatted as an entity-based output, such that each row of the query results represents a model entity, and includes multiple data values per attribute. Entity-based output is useful for presenting query results that would otherwise appear as Cartesian products.

Figure 4:
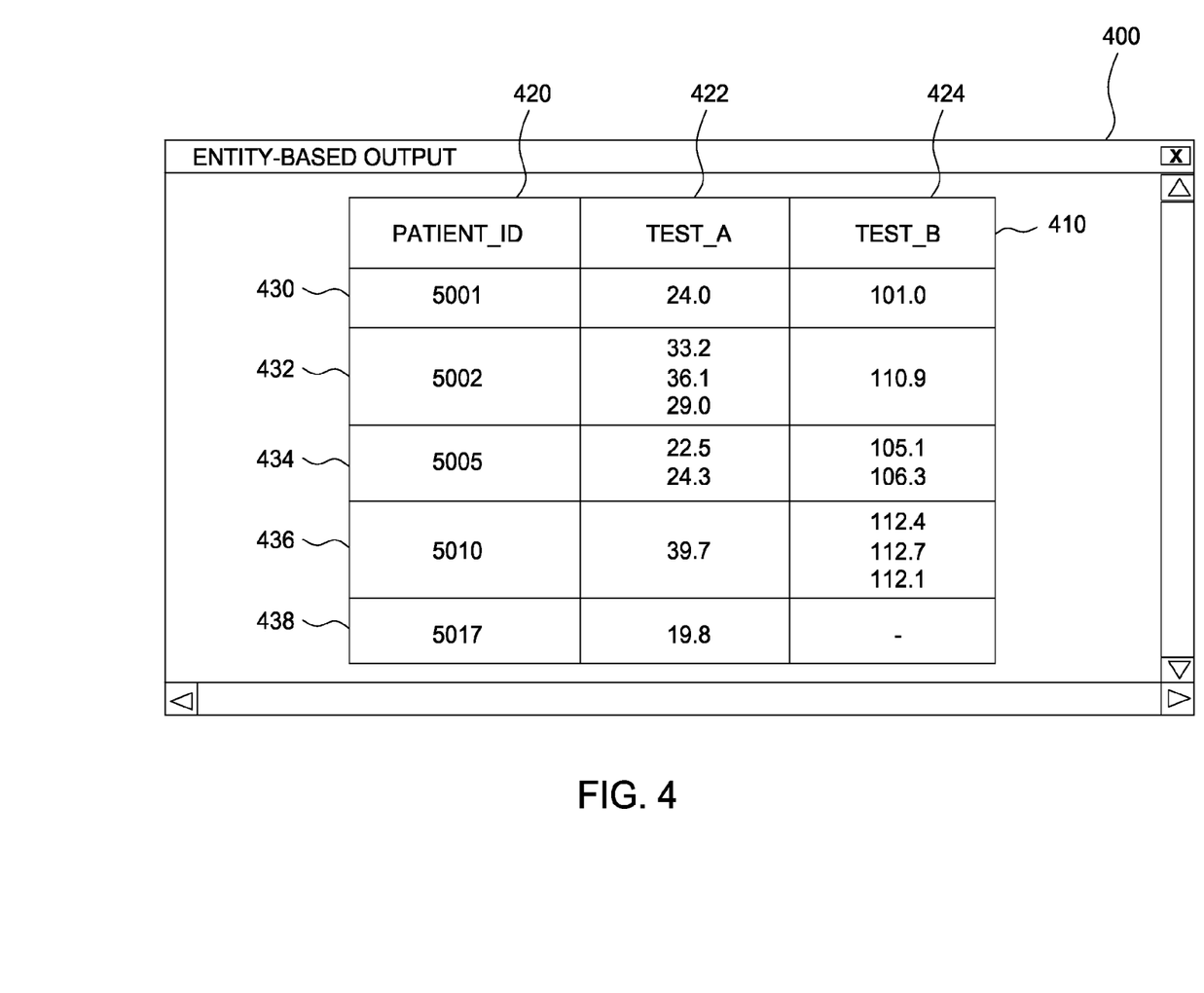
FIG. 4 illustrates a graphical user interface of a query application that is displaying an entity-based output, according to one embodiment of the invention.

FIG. 4 illustrates a GUI 400 of a query application that is displaying an entity-based output 410, according to one embodiment of the invention. As shown, the exemplary entity-based output 410 includes a PATIENT_ID column 420, a TEST_A column 422, a TEST_B column 424, and a set of rows 430, 432, 434, 436, 438. In this example, the underlying query is composed with the PATIENT_ID field as the model entity. As such, in entity-based output 410, each patient ID is represented by a single row, and the values for each instance of TEST_A and TEST_B that was administered to a given patient are included in the same row. The entity-based format can be seen in row 432, which includes a value of "5002" in the query entity column (i.e., PATIENT_ID column 420), and has three values "33.2," "36.1," and "29.0" in the TEST_A column 422. Thus, the query results show that patient "5002" was given TEST_A on three different occasions. Similarly, row 434 also has an entity-based format, and includes a single value "5005" in the PATIENT_ID column 420, has two values in the TEST_A column 422, and has two values in the TEST_B column 424. Finally, row 436 also has an entity-based format, as it includes a single value "5010" in the PATIENT_ID column 420, has one value in the TEST_A column 422, and has three values in the TEST_B column 424.

It should be noted that the entity-based output 410 shown in FIG. 4 is provided for illustrative purposes only. That is, the entity-based output 410 is representative of any data structure which includes multiple values per field. For example, Table I illustrates an XML data structure corresponding to the first two rows of the entity-based output 410. Only the first two rows of the entity-based output 410 has been shown for brevity; however, it is understood that the remaining portion of the entity-based output will have a corresponding XML structure, as appreciated by those skilled in the art.

TABLE I

XML DATA STRUCTURE EXAMPLE

| | |
|---|---|
| 001 | <Results> |
| 002 |   <ColumnHeader> |
| 003 |     <ColumnHeaderCell> |
| 004 |       Patient_ID |
| 005 |     </ColumnHeaderCell> |
| 006 |     <ColumnHeaderCell> |
| 007 |       TEST_A |
| 008 |     </ColumnHeaderCell> |
| 009 |     <ColumnHeaderCell> |
| 010 |       TEST_B |
| 011 |     </ColumnHeaderCell> |
| 012 |   </ColumnHeader> |
| 013 |   <RowData> |
| 014 |     <Row> |
| 015 |       <RowCell> |
| 016 |         5001 |
| 017 |       </RowCell> |
| 018 |       <RowCell> |
| 019 |         24.0 |
| 020 |       </RowCell> |
| 021 |       <RowCell> |
| 022 |         101.0 |
| 023 |       </RowCell> |
| 024 |     </Row> |
| 025 |     <Row> |
| 026 |       <RowCell> |
| 027 |         5002 |
| 028 |       </RowCell> |
| 029 |       <RowCell> |
| 030 |         <Row> |
| 031 |           <RowCell> |
| 032 |             33.2 |
| 033 |           </RowCell> |
| 034 |           <RowCell> |
| 035 |             36.1 |
| 036 |           </RowCell> |
| 037 |           <RowCell> |
| 038 |             29.0 |
| 039 |           </RowCell> |
| 040 |         </Row> |
| 041 |       </RowCell> |
| 042 |       <RowCell> |
| 043 |         110.9 |
| 044 |       </RowCell> |
| 045 |     </Row> |

Figure 3:
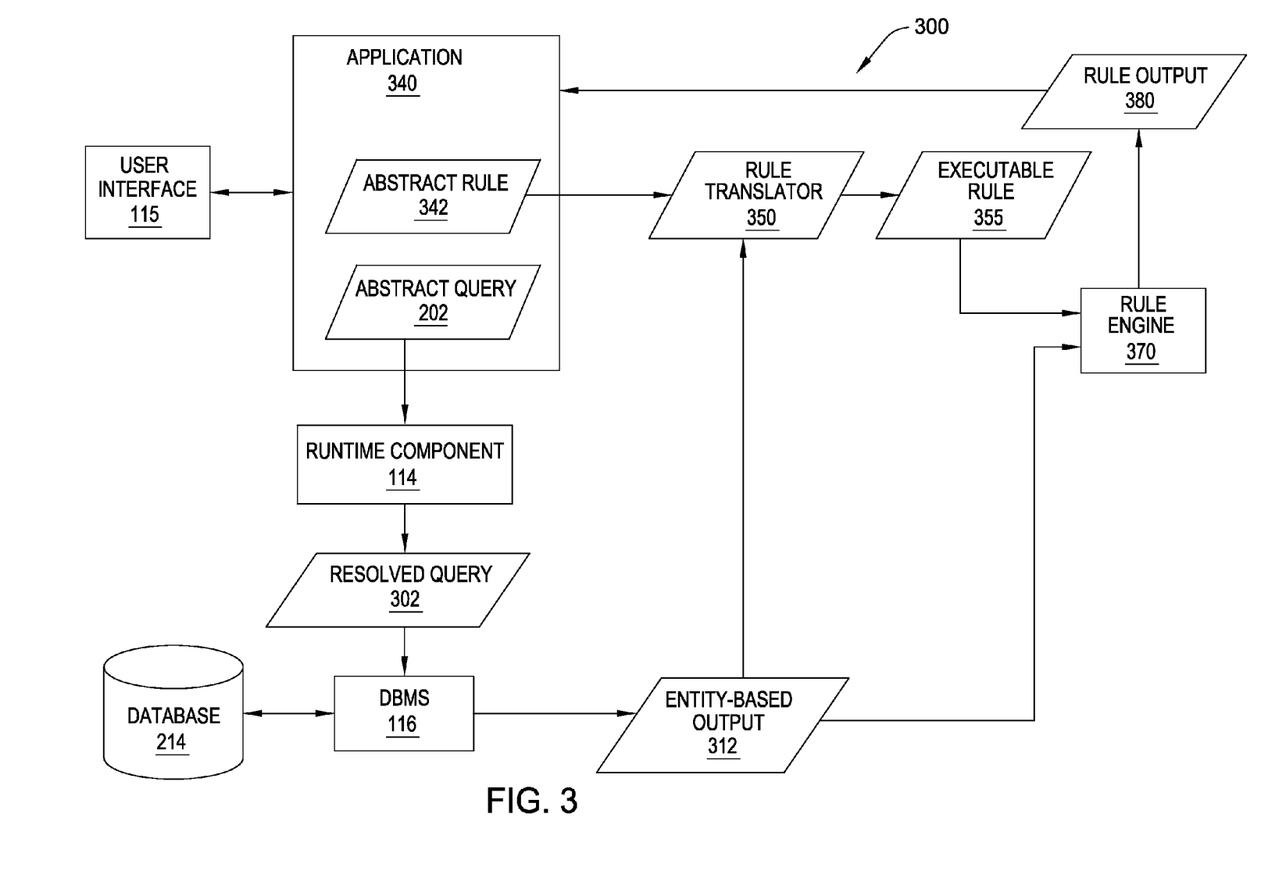
FIG. 3 illustrates a relational view of software components for processing abstract rules with query results having an entity-based format, according to one embodiment of the invention.

In most cases, query results having entity-based formats (e.g., entity-based output 410 of FIG. 4, or the XML data of Table I) are not suitable to be used as inputs for abstract rules. Since the rows of such query results can vary in the number of values that exist for a given attribute, they may not match the logical fields included in abstract rules. FIG. 3 illustrates a relational view 300 of software components for processing abstract rules with query results having an entity-based format, according to one embodiment of the invention. The software components of relational view 300 include a user interface 115, an application 340, a runtime component 114, a database management system (DBMS) 116, a database 214, a rule translator 350, and a rule engine 370.

As shown, the application 340 includes two data objects, an abstract rule 342 and an abstract query 202. Illustratively, the abstract rule 342 and abstract query 202 are created in the user interface 115, which in this example is a graphical user interface. However, it should be noted that the user interface 115 is only shown by way of example; any suitable requesting entity may create abstract rules 342 and abstract queries 202 (e.g., the application 340, an operating system, or an end user). As described, the abstract query 202 is composed by using logical fields to specify query conditions and results fields. Similarly, the abstract rule 342 is composed by using logical fields to specify a rule predicate and a rule action. In one embodiment, the abstract query 202 includes a particular logical field that defines the focus of the query, hereinafter referred to as a model entity. Commonly assigned, co-pending U.S. patent application Ser. No. 10/403,356, filed Mar. 31, 2003, titled "Dealing with Composite Data through Data Model Entities," discloses the use of model entities in queries.

In one embodiment, the abstract query 202 is translated by the runtime component 114 into a resolved query 302. The resolved query 302 is submitted to the DBMS 116 for execution against the database 214, thus producing an entity-based output 312. The entity-based output 312 is a set of query results which are composed with an entity-based format.

In one embodiment, the rule translator 350 receives the entity-based output 312, and uses it to translate the abstract rule 342 to an executable rule 355 that is compatible with the entity-based output 312. More specifically, a separate executable rule 355 is generated based on each row of the entity-based output 312. If a row of the entity-based output 312 includes a column that stores multiple values, then each value is assigned to a new attribute name. The executable rule 355 is then composed to reference an equivalent set of logical fields.

In addition, the rule translator 350 formats the executable rule 355 in the data format required by the rule engine 370. One example of such a data format is the Arden syntax, which is used in rule engines for medical knowledge. Further, the rule translator 350 configures the executable rule 355 so it is resolved to the database 214. That is, instead of the logical fields referenced by the abstract rule 342, the executable rule 355 references data structures in the underlying physical database 214. As shown, the executable rule 355 is then processed by the rule engine 370, using the corresponding row of the entity-based output 312 as input. As a result, the rule engine 370 produces the rule output 380. Each row of the entity-based output 312 may be processed in the manner described above, until all rows have been used as input for the abstract rule 342.

The following example illustrates the generation of the executable rule 355 such that it is compatible with the entity-based output. In this example, the entity-based output 410 illustrated in FIG. 4 is to be used as input to an abstract rule. The abstract rule is the following:

IF (TEST_A>30.0)
    THEN Diagnosis="Positive"

If the row 430 of the entity-based output 410 is used as input for the exemplary abstract rule, no problem arises due to incompatible fields, since the row 430 and the abstract rule both reference one TEST_A field. Row 430 has a TEST_A value of "24.0," so the rule predicate "TEST_A>30.0" is not triggered. Thus, for patient ID "5001", the exemplary abstract rule doe not result in a diagnosis.

However, in this example, row 432 of the entity-based output 410 cannot be used as input to the exemplary abstract rule, since row 432 includes three values for the TEST_A column, and the exemplary abstract rule only references one TEST_A logical field. That is, the numbers of corresponding fields do not match. Thus, the fields of the exemplary abstract rule and of row 432 must be modified to be compatible.

In one embodiment, a set of fields may be created to store the multiple values of an entity-based output. The created fields may be labeled with an enumerated version of the underlying field name. That is, the TEST_A column 422 of row 432, which includes three values, may be represented by three enumerated fields:

TEST_A:1="33.2"
TEST_A:2="36.1"
TEST_A:3="29.0"

In this example, the enumerated field names are derived from the name of the column "TEST_A," to which is appended a colon and a number.

The exemplary abstract rule may be modified in a similar manner, so that it is compatible with enumerated fields representing the entity-based output 312. Thus, in the above example, the logical field TEST_A included in the exemplary abstract rule is translated to the enumerated fields TEST_A:1, TEST_A:2, and TEST_A:3 included in an executable rule. The executable rule may take the following form:

IF ((TEST_A:1>30.0) OR (TEST_A:2>30.0) OR (TEST_A:3>30.0))
THEN Diagnosis="Positive"

If this executable rule is now processed by a rule engine 370, using the row 432 as input, the rule output 380 would be a diagnosis of "Positive." This result occurs because row 432 has a TEST_A:3 value of "29.0," thus satisfying the rule predicate.

Of course, the above example is provided for illustrative purposes only, and is not intended to limit the scope of the invention. It should also be noted that the components of the relational view 300 are illustratively shown as separate software components. However, embodiments are contemplated in which functionality of any component may be incorporated in another component.

Figure 5:
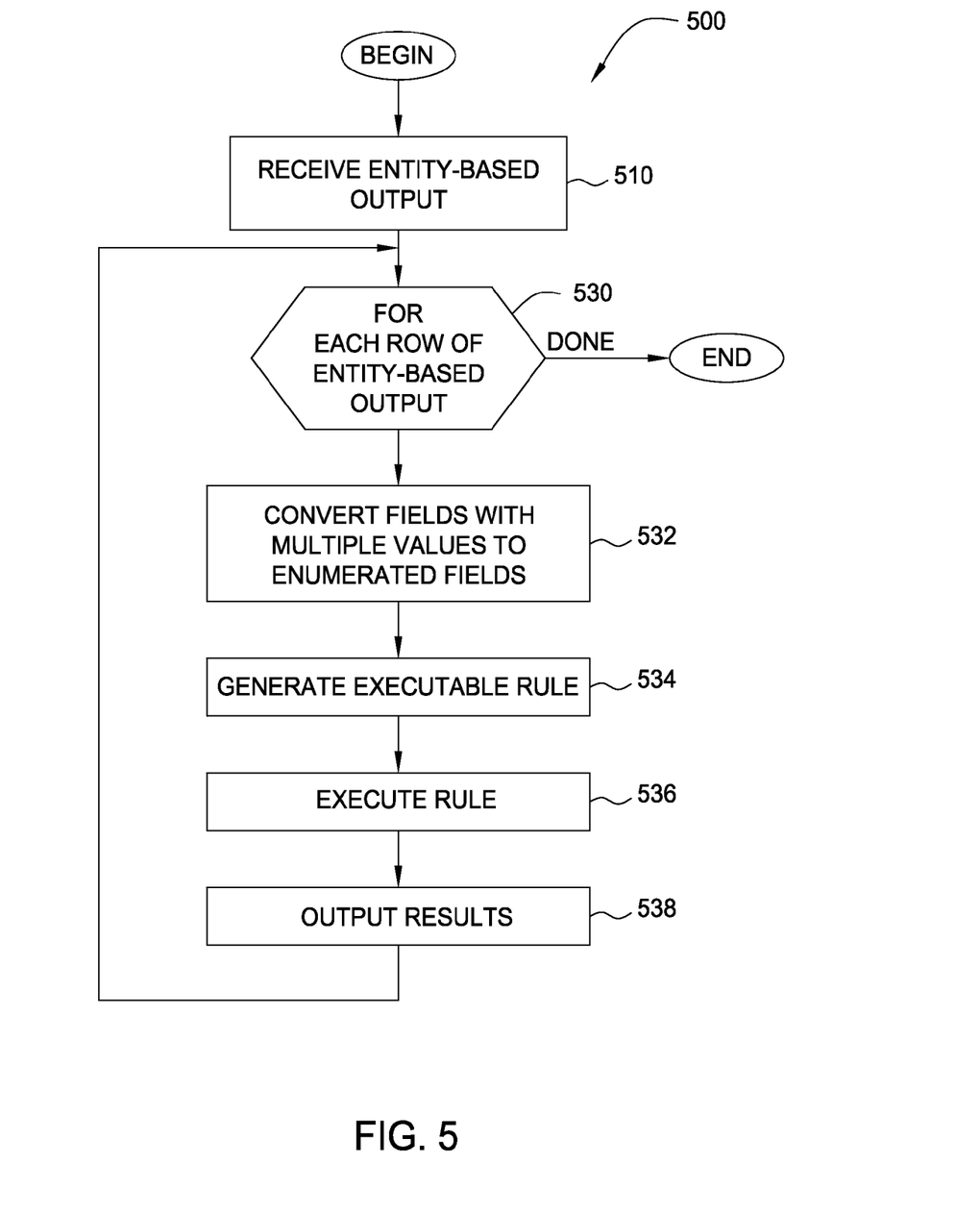
FIG. 5 is a flow diagram illustrating a method for processing abstract rules with query results having an entity-based format, according to one embodiment of the invention.

FIG. 5 is a flow diagram illustrating a method 500 for processing abstract rules with query results having an entity-based format, according to one embodiment of the invention. The method 500 begins at step 510, by receiving a set of query results having an entity-based format (e.g., entity-based output 410). That is, by receiving query results that are grouped for a given model entity, and are combined so they are presented in a single row, with each column including all values for that attribute and for that model entity.

At step 530, the method 500 enters a loop (defined by steps 530, 532, 534, 536, and 538) for processing each row of the query results as input of an abstract rule. At step 532, any fields (i.e., columns) of the current row that include multiple values are converted to enumerated fields, with one enumerated field for each value. The enumerated fields may be labeled with the name of the field, followed by a number (e.g., "TEST_A:3"). Of course, such enumerated fields are described for illustrative purposes only. Other methods of generating multiple fields corresponding to multiple values, or of formatting the multiple fields, are also contemplated.

At step 534, an executable rule is generated from an abstract rule. For example, the executable rule 355 may be generated from abstract rule 342. The executable rule is composed to reference the fields of the current row of query results, including any enumerated fields created in step 532. In addition, the executable rule is resolved to the physical database (e.g., database 214), and is converted to the data format required by the selected rule engine (e.g., rule engine 370). This step may be performed, for example, by the rule translator 350.

At step 536, the executable rule generated in step 534 is executed, using the query results as an input. The query results include any enumerated fields created in step 532. At step 538, the results of processing the executable rule in step 536 are output (e.g., rule output 380). The steps 536 and 538 may be performed, for example, by the rule engine 370. Once all rows of the query results are completed at step 530, the method 500 is completed.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing an abstract rule, comprising:
   receiving an abstract rule having a conditional statement and a consequential statement, wherein the consequential statement defines a particular recommendation that is returned when the conditional statement is satisfied, wherein the conditional statement and the consequential statement are defined using a set of logical fields, and wherein the logical fields are defined in an abstraction model that models underlying physical data in a manner making a schema of the physical data transparent to a user of the abstraction model;
   receiving a set of query results including a row having a plurality of values for a column;
   generating a plurality of value fields, each storing one of the plurality of values for the column in the row;
   transforming the abstract rule to generate an executable rule, wherein each logical field included in the abstract rule is replaced with at least one of the generated value fields logically related to the logical field being replaced; and
   processing, by a rules engine, the executable rule, using the generated value fields as rule inputs.

2. The method of claim 1, further comprising:
   If, for the processed executable rule, the conditional statement is resolved to true, then returning the particular recommendation.

3. The method of claim 1, wherein each generated value field is named with a unique label comprising the name of the column of the query results from which the generated value field was derived and a numerical identifier.

4. The method of claim 1, further comprising, prior to receiving the set of query results:
   executing an abstract query against a database.

5. The method of claim 1, wherein transforming the abstract rule comprises:
   retrieving a specification of the abstract rule in a first computer-readable language; and
   transforming the specification into a language which is accepted by the rules engine.

6. The method of claim 1, wherein receiving a set of query results comprises:
   wherein each row of the set of query results includes a set of values for attributes of a single model entity, wherein each column of the query results includes all values of a particular attribute that correspond to the model entity, wherein a model entity is defined by a value of a key attribute of the query results, and wherein the model entity defines the focus for a query operation.

7. The method of claim 6, wherein receiving a set of query results further comprises:
   wherein instances of the model entity are distinguished by an identifier in an underlying database.

8. A computer readable storage device containing a program which, when executed, performs an operation, comprising:
   receiving an abstract rule having a conditional statement and a consequential statement, wherein the consequential statement defines a particular recommendation that is returned when the conditional statement is satisfied, wherein the conditional statement and the consequential statement are defined using a set of logical fields, and wherein the logical fields are defined in an abstraction model that models underlying physical data in a manner making a schema of the physical data transparent to a user of the abstraction model;

receiving a set of query results including a row having a plurality of values for a column;

generating a plurality of value fields, each storing one of the plurality of values for the column in the row;

transforming the abstract rule to generate an executable rule, wherein each logical field included in the abstract rule is replaced with at least one of the generated value fields logically related to the logical field being replaced; and processing, by a rules engine, the executable rule, using the generated value fields as rule inputs.

9. The computer readable storage device of claim 8, further comprising:

If, for the processed executable rule, the conditional statement is resolved to true, then returning the particular recommendation.

10. The computer readable storage device of claim 8, wherein each generated value field is named with a unique label comprising the name of the column of the query results from which the generated value field was derived and a numerical identifier.

11. The computer readable storage device of claim 8, further comprising, prior to receiving the set of query results:

executing an abstract query against a database.

12. The computer readable storage device of claim 8, wherein transforming the abstract rule comprises:

retrieving a specification of the abstract rule in a first computer-readable language; and transforming the specification into a language which is accepted by the rules engine.

13. The computer readable storage device of claim 8, wherein receiving a set of query results comprises:

wherein each row of the set of query results includes a set of values for attributes of a single model entity, wherein each column of the query results includes all values of a particular attribute that correspond to the model entity, wherein a model entity is defined by a value of a key attribute of the query results, and wherein the model entity defines the focus for a query operation.

14. The computer readable storage device of claim 13, wherein receiving a set of query results comprises:

wherein instances of the model entity are distinguished by an identifier in an underlying database.

15. A system, comprising:

a rules engine;

an abstract rule translator; and a processor configured to execute the abstract rule translator to:

receive an abstract rule having a conditional statement and a consequential statement; wherein the consequential statement defines a particular recommendation that is returned when the conditional statement is satisfied; wherein the conditional statement and the consequential statement are defined using logical field definitions defined in an abstraction model that models underlying physical data in a manner making a schema of the physical data transparent to a user of the abstraction model;

receive a set of query results including a row having a plurality of values for a column;

generate a plurality of value fields, each storing one of the plurality of values for the column in the row;

transform the abstract rule to generate an executable rule, wherein each logical field included in the abstract rule is replaced with at least one of the generated value fields logically related to the logical field being replaced; and process the executable rule, using the rules engine, and using the generated value fields as rule inputs.

16. The system of claim 15, further comprising:

If, for the processed executable rule, the conditional statement is resolved to true, then returning the particular recommendation.

17. The system of claim 15, wherein each generated value field is named with a unique label comprising the name of the column of the query results from which the generated value field was derived and a numerical identifier.

18. The system of claim 15, further comprising:

A runtime component configured to execute an abstract query against a database.

19. The system of claim 15, wherein transforming the abstract rule comprises:

retrieving a specification of the abstract rule in a first computer-readable language; and transforming the specification into a language which is accepted by the rules engine.

20. The system of claim 15, wherein receiving a set of query results comprises:

wherein each row of the set of query results includes a set of values for attributes of a single model entity, wherein each column of the query results includes all values of a particular attribute that correspond to the model entity, wherein a model entity is defined by a value of a key attribute of the query results, and wherein the model entity defines the focus for a query operation.

21. The system of claim 20, wherein receiving a set of query results further comprises:

wherein instances of the model entity are distinguished by an identifier in an underlying database.

* * * * *